May 28, 1935.  J. V. AMENTA  2,003,030
DENTAL CLASP
Filed June 7, 1934
Fig. 1.
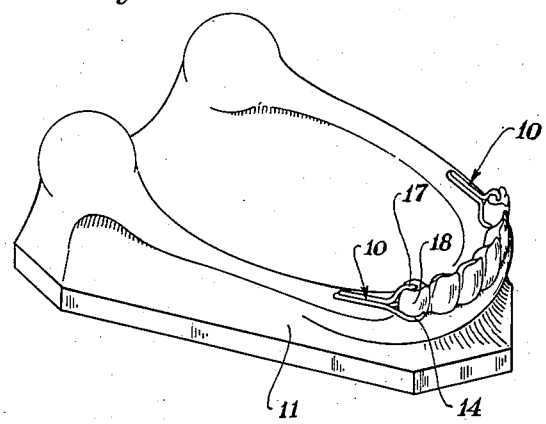
Fig. 2.
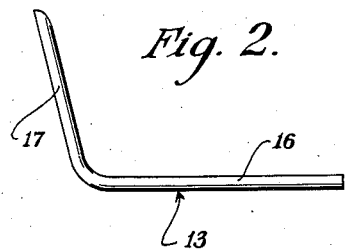
Fig. 3.
Fig. 4.
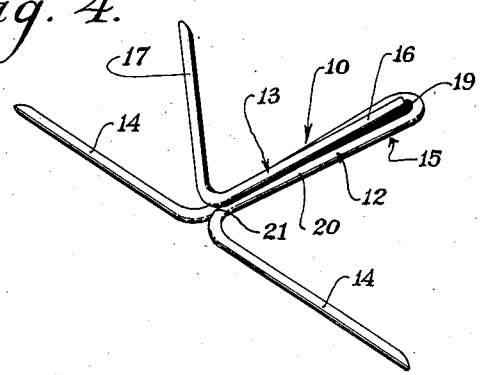
Fig. 6.
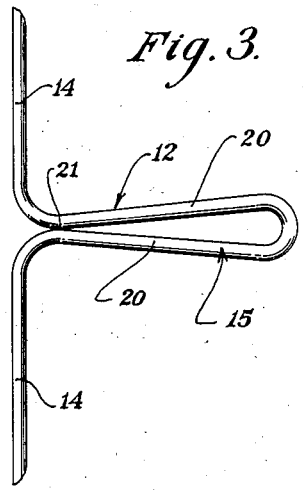
Fig. 5.
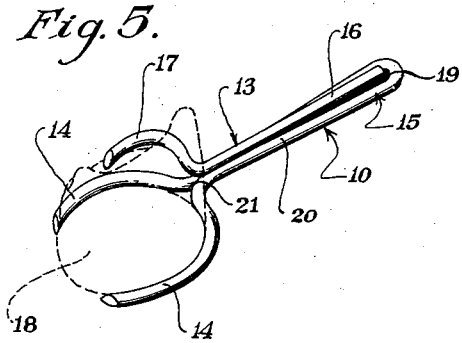
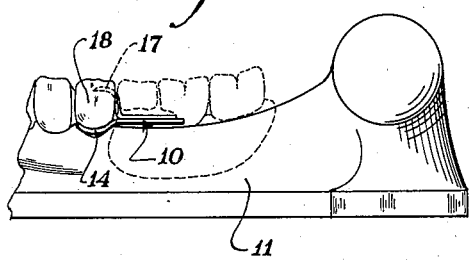
INVENTOR.
John V. Amenta
BY Threely and Cannon
HIS ATTORNEYS Patented May 28, 1935

2,003,030

UNITED STATES PATENT OFFICE 2,003,030

DENTAL CLASP

John V. Amenta, Chicago, Ill.

Application June 7, 1934, Serial No. 729,368

2 Claims. (Cl. 32—5)

This invention relates to a dental clasp.

It is an object of this invention to provide an improved dental clasp which is relatively simple and inexpensive in construction and efficient in use.

Another object of the invention is to provide a new and improved dental clasp for anchoring a dental plate or bridge, or so-called "partial denture", to a natural tooth.

A further object of the invention is to provide a novel method for making the new dental clasp embodied in the invention.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view showing a preferred form of the new dental clasp anchoring a natural tooth to a dental plate;

Fig. 2 is a side elevational view of one part or element of the new dental clasp;

Fig. 3 is a plan view of another part or element of the new clasp;

Fig. 4 is a perspective view of a preferred form of the several elements of the new dental clasp assembled and ready to be formed into the completed clasp;

Fig. 5 is a perspective view of the new dental clasp formed into the shape in which it is used; and Fig. 6 is a side elevational view showing the new dental clasp in use and attached to a dental plate.

A preferred form of the new dental clasp is shown in the drawing and is therein generally indicated at 10. For the purpose of illustrating the use of the invention the same is shown as used in conjunction with a dental plate or so-called "partial denture", it being understood, of course, that the new clasp may be used to anchor to dental bridges as well as to a natural tooth.

The new clasp 10 is made, in general, of two parts 12 and 13, both of which are preferably formed from a suitable metal wire or metal having a wire-like form. The part 12 includes a pair of fingers or arms 14 and a loop-shaped anchor or attaching portion 15 which includes leg portions 20 (Fig. 4), the latter meeting at a point 21 where they merge into the arm portions 14; while the part 13 includes a shank portion 16 and an occlusal rest portion or cusp 17.

The novel method of making the new clasp is as follows: The member 13 (Fig. 2) is arranged upon the member 12 (Fig. 3) in the manner shown in Fig. 4, with the shank portion 16 of the member 13 resting upon the looped attaching or anchor portion 15, at the point 21, and extending between the leg portions 20 of the latter. The shank portion 16 of the member 13 is then soldered, as at 19, to the anchor portion 15 of member 12, thus securing these two parts together. The arms or fingers 14 of the part 12 are then bent or formed into curved formation in which they are shown in Fig. 5, and in which position they cooperate to form a clasp that is adapted to embrace a natural tooth, such as 18; while the cusp or occlusal rest portion 17 is angularly formed or bent to project over the occlusal surface of the tooth 18 and to rest in the indentation formed in the latter. The clasp 10 thus formed may then be anchored to a dental plate, such as 11, or other partial denture in any suitable manner, as by being embedded therein, or it may be secured to a dental bridge, as by being soldered thereto.

While I have illustrated and described the preferred form of construction for carrying my invention into effect, this is capable of variation and modification, without departure from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A dental clasp formed from two pieces of metal; one of said pieces being formed to provide clasp portions and an anchor loop extending laterally from said clasp portions and including spaced arms lying substantially within a common plane but spaced slightly from each other throughout at least a part of their extent so to provide a slit or space therebetween; and the other of said pieces being formed to provide a cusp or occlusal rest portion extending between said clasp portions but in a plane above the latter; said second-named piece including a shank portion extending between said arms in a plane slightly above the latter and soldered thereto within said slit or space.

2. A dental clasp formed from two pieces of wire; one of said pieces of wire being formed to provide clasp portions and an anchor loop extending laterally from said clasp portions and including spaced arms lying substantially within a common plane but spaced slightly from each other throughout at least a part of their extent so to provide a slit or space therebetween; and the other of said pieces of wire being formed to provide a cusp or occlusal rest portion extending between said clasp portions but in a plane slightly above the latter; said second-named piece of wire including a shank portion extending between said arms and soldered thereto within said slit or space.

JOHN V. AMENTA.